US010330878B2

(12) United States Patent
Chawda et al.

(10) Patent No.: US 10,330,878 B2
(45) Date of Patent: Jun. 25, 2019

(54) OPTICAL FIBER CABLE WITH ADHESION CONTROL LAYER

(71) Applicant: Corning Optical Communications LLC, Hickory, NC (US)

(72) Inventors: Amit Chawda, Mooresville, NC (US); Yangbin Chen, Lima, NY (US); Ching-Kee Chien, Horseheads, NY (US)

(73) Assignee: Corning Optical Communications LLC, Hickory, NC (US)

( * ) Notice: Subject to any disclaimer, the term of this patent is extended or adjusted under 35 U.S.C. 154(b) by 51 days.

(21) Appl. No.: 15/069,108

(22) Filed: Mar. 14, 2016

(65) Prior Publication Data

US 2016/0274323 A1    Sep. 22, 2016

Related U.S. Application Data

(60) Provisional application No. 62/135,239, filed on Mar. 19, 2015.

(51) Int. Cl.
*G02B 6/44*    (2006.01)
(52) U.S. Cl.
CPC ......... *G02B 6/4429* (2013.01); *G02B 6/4435* (2013.01); *G02B 6/4479* (2013.01); *G02B 6/4488* (2013.01)
(58) Field of Classification Search
CPC .. G02B 6/4429; G02B 6/4479; G02B 6/4435; G02B 6/4488
USPC ........................................................ 385/102
See application file for complete search history.

(56) References Cited

U.S. PATENT DOCUMENTS

| 4,351,913 | A | * | 9/1982 | Patel ......................... C08J 9/32 521/139 |
| 8,145,022 | B2 | | 3/2012 | Overton et al. |
| 8,577,196 | B1 | | 11/2013 | McNutt |
| 8,639,075 | B1 | | 1/2014 | Burnett |
| 8,649,644 | B2 | | 2/2014 | Greenwood, III et al. |
| 8,923,676 | B2 | * | 12/2014 | Blazer ................. G02B 6/4488 385/100 |
| 2004/0154957 | A1 | * | 8/2004 | Keeney ............... C10M 171/02 208/18 |

(Continued)

FOREIGN PATENT DOCUMENTS

EP    2765444 A1    8/2014

OTHER PUBLICATIONS

International Search Report and Written Opinion PCT/US2016/020175 dated May 11, 2016.

(Continued)

*Primary Examiner* — Jerry M Blevins
(74) *Attorney, Agent, or Firm* — William D. Doyle

(57) ABSTRACT

An optical communication cable and related systems and methods are provided. The cable includes an adhesion control material between a reinforcement sheet and a cable jacket. The adhesion control material includes a carrier fluid and a particulate material dispersed in the carrier fluid. The method includes extruding a polymer material over the wrapped sheet of reinforcement material to form a cable jacket, and the adhesion control material is located between an outer surface of the wrapped reinforcement sheet and an inner surface of the cable jacket.

16 Claims, 2 Drawing Sheets

(56) References Cited

U.S. PATENT DOCUMENTS

2010/0027948 A1* 2/2010 Wasserman ............ H01B 7/295
　　　　　　　　　　　　　　　　　　　　　　　　385/101
2012/0051702 A1 　 3/2012 Blazer et al.

OTHER PUBLICATIONS

European Patent Application No. 16765407.8 Office Action dated Oct. 8, 2018; 8 Pages; European Patent Office.

* cited by examiner

OPTICAL FIBER CABLE WITH ADHESION CONTROL LAYER

CROSS-REFERENCE TO RELATED APPLICATIONS

This application claims the benefit of priority to U.S. Provisional Application No. 62/135,239, filed on Mar. 19, 2015, the entirety of which is incorporated herein by reference.

BACKGROUND

The disclosure relates generally to optical communication cables and more particularly to optical communication cables including a barrier layer of material configured to control interaction or bonding between the outer cable jacket and an internal armor layer. Optical communication cables have seen increased use in a wide variety of electronics and telecommunications fields. Optical communication cables may contain or surround one or more optical communication fibers. The cable provides structure and protection for the optical fibers within the cable.

SUMMARY

One embodiment of the disclosure relates to a method of forming an optical communication cable. The method includes providing a plurality of elongate optical transmission elements, and wrapping a sheet of reinforcement material around the plurality of elongate optical transmission elements such that the plurality of elongate optical transmission elements are located within a channel defined by an inner surface of the wrapped sheet of reinforcement material. The method includes applying an adhesion control material onto an outer surface of the reinforcement material. The adhesion control material includes a carrier fluid and a particulate material dispersed in the carrier fluid. The method includes extruding a polymer material over the wrapped sheet of reinforcement material to form a cable jacket, and the adhesion control material is located between an outer surface of the wrapped reinforcement sheet and an inner surface of the cable jacket.

An additional embodiment of the disclosure relates to an optical communication cable. The cable includes an extruded cable body formed from a polymer material, and the cable body has an inner surface defining a channel within the cable body. The cable includes an optical transmission element located within the channel and a reinforcement sheet surrounding the optical transmission element. The cable includes an adhesion control material comprising a liquid carrier material and a plurality of particles suspended within the carrier material. At least some of the particles are positioned between the reinforcement sheet and the cable body such that at least some of the particles contact an outer surface of the reinforcement sheet and an inner surface of the cable body.

An additional embodiment of the disclosure relates to an optical communication cable. The cable includes an extruded cable body formed from a polymer material, and the cable body has an inner surface defining a channel within the cable body. The cable includes an optical transmission element located within the channel and a reinforcement sheet surrounding the optical transmission element. The cable includes an adhesion control layer comprising a plurality of particles positioned between the reinforcement sheet and the cable body such that at least some of the particles contact an outer surface of the reinforcement sheet and an inner surface of the cable body. The particles are formed from a material having a density of less than 2.5 g/ml and having an average particle diameter between 1 micrometer and 200 micrometers.

An additional embodiment of the disclosure relates to an optical communication cable. The cable includes an extruded cable body formed from a polymer material, and the cable body has an inner surface defining a channel within the cable body. The cable includes a first optical cable core element located within the channel and a second optical cable core element located within the channel. The cable includes an adhesion control material comprising a liquid carrier material and a plurality of particles dispersed within the carrier material. The adhesion control material is coated onto an outer surface of at least one of the first optical cable core element and the second optical cable core element, wherein the particles are formed from a material having a density of less than 2.5 g/ml and having an average particle diameter between 1 micrometer and 200 micrometers.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
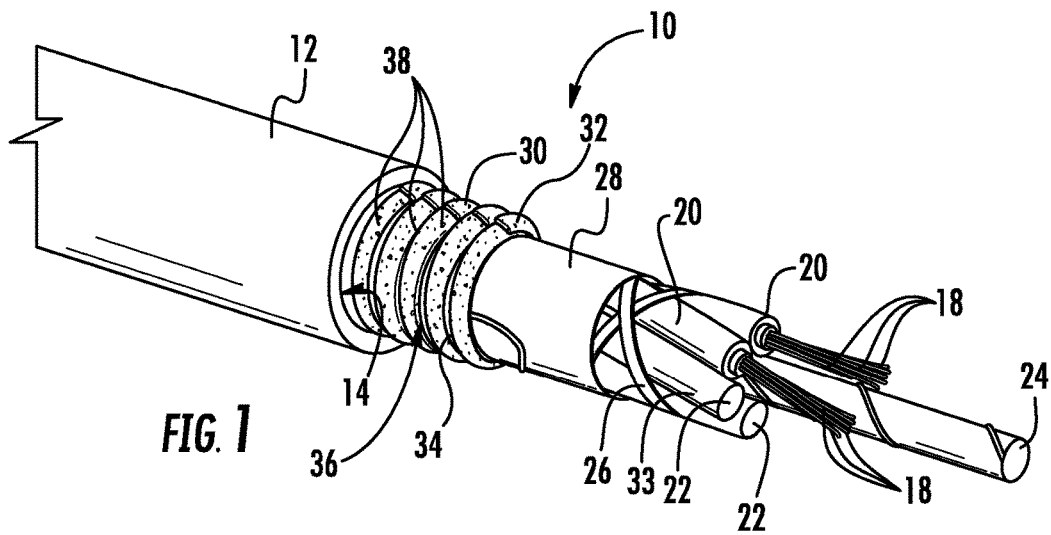
FIG. 1 is a perspective view of an optical communication cable according to an exemplary embodiment.

Referring generally to the figures, various embodiments of an optical communication cable (e.g., a fiber optic cable, an optical fiber cable, etc.) and formation method and system are shown. In general, the cable embodiments disclosed herein include a cable body or jacket typically formed from a polymer material (e.g., a polyethylene material). One or more optical fibers are wrapped in a protective, reinforcement or armor material (e.g., a corrugated metal sheet), and the armored group of optical fibers is positioned in a central channel of the cable body. Generally, the cable jacket provides physical support and protection to the optical fibers within the cable, and the armor material provides additional reinforcement to the optical fibers within the cable body.

In some cable designs, a certain amount of adhesion may occur between the outer surface of the armor layer and the inner surface of the cable jacket. In some embodiments, such adhesion may develop as the cable jacket is extruded over the armor layer because of melt bonding between the polymer material of the cable jacket and a thin polymer coating or laminate on the outer surface for the armor material. High levels of bonding may make it difficult to separate the cable jacket from the armor layer during various procedures in which the armor layer is accessed (e.g., for attaching a ground wire to the armor layer) or in which the optical fibers of the cable are accessed (e.g., splicing procedures, connectorization, etc.).

In the cable embodiments discussed herein, the optical communication cable includes an adhesion control layer or coating of material surrounding the armor layer and positioned between the armor layer and the cable jacket. In various embodiments, the adhesion control layer includes a fluid carrier material and a particulate material dispersed and/or suspended in the carrier material. In some such embodiments, the fluid carrier material and the particulate material form dispersions. In such embodiments, the fluid carrier material facilitates that application and attachment of the particulate material to the outer surface of the armor layer at relatively high processing speeds.

The particulate material is a material that is immiscible or otherwise incompatible with the material of the cable jacket such that the particulate material acts as a physical barrier limiting adhesion between the cable jacket and outer surface of the armor layer that may otherwise occur during cable jacket extrusion. Thus, in such embodiments, the cable and related methods discussed herein allow for the formation of an adhesion control layer within an optical cable at higher line speeds (e.g., formation of 55 meters of optical cable per minute) with suitable adhesion control as compared to other adhesion control structures such as dry-applied talc powers, tapes, wraps, nets, etc. Further, the adhesion control material, related systems and methods discussed herein eliminates the need for the heating devices common in hot-melt adhesive based systems and also eliminates the complexity of additional wrapping devices and powder applicators used in some adhesion control systems.

Figure 2:
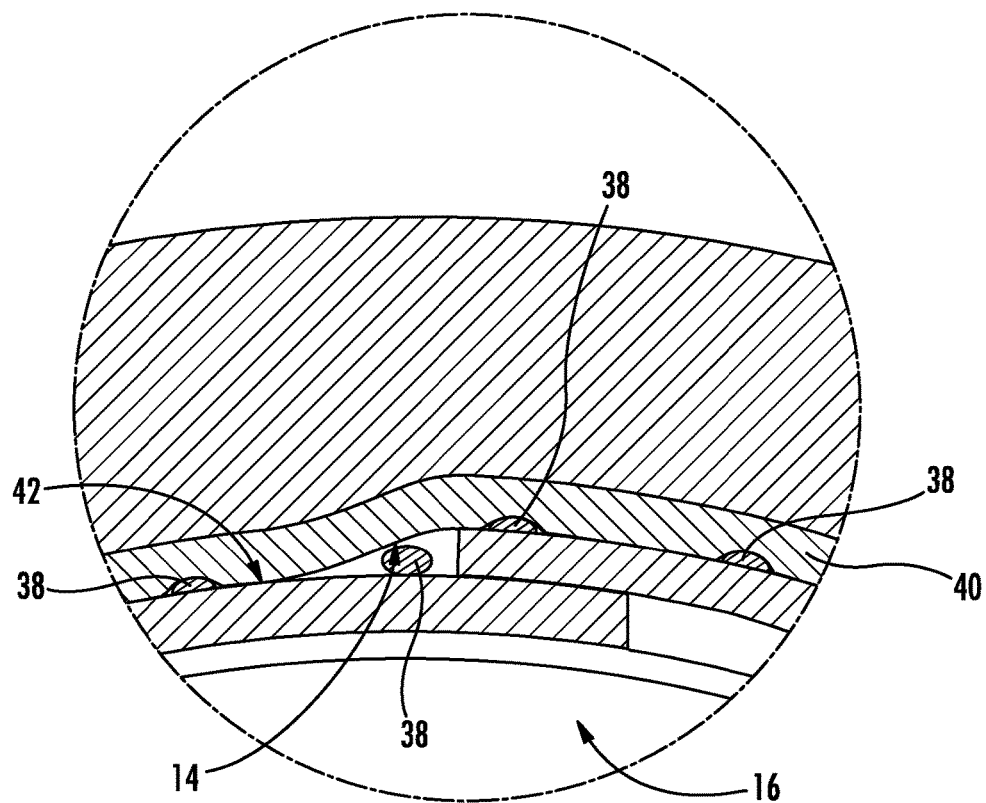
FIG. 2 is a detailed axial cross-sectional view of a portion of the cable of FIG. 1 according to an exemplary embodiment.

Referring to FIGS. 1 and 2, an optical communication cable, shown as cable 10, is shown according to an exemplary embodiment. Cable 10 includes a cable body, shown as cable jacket 12, having an inner surface 14 that defines a channel, shown as central bore 16. In various embodiments, cable jacket 12 may be made from a polyethylene, such as a medium density polyethylene. A plurality of core elements (e.g., optical transmission elements, strength members or fibers, filler rods, armor layers, water block layers, rip cords, binders etc.) are located within central bore 16 and/or embedded in cable jacket 12. In the embodiment of FIG. 1, a plurality of optical transmission elements, shown as optical fibers 18, are located within bore 16. Generally, cable 10 provides structure and protection to optical fibers 18 during and after installation (e.g., protection during handling, protection from elements, protection from vermin, etc.).

In the embodiment shown in FIGS. 1 and 2, bundles of optical fibers 18 are located within buffer tubes 20. One or more filler rods 22 may also be located within bore 16. Filler rods 22 and buffer tubes 20 are arranged around a central support rod 24 formed from a material such as glass-reinforced plastic or metal. Helically wound binders 26 may be wrapped around buffer tubes 20 and filler rods 22 to hold these elements in position around support rod 24. A water blocking material, such as water barrier tape 28, may be located around the wrapped buffer tubes 20 and filler rods 22.

A reinforcement sheet or layer, shown as armor layer 30, is located outside of water barrier 28. Armor layer 30 is wrapped around the interior elements (including optical fibers 18) of cable 10 such that armor layer 30 surrounds optical fibers 18 within bore 16. Armor layer 30 generally extends all or substantially all of the axial length of cable 10. Armor layer 30 generally provides an additional layer of protection to fibers 18 within cable 10, and may provide resistance against damage (e.g., damage caused by contact or compression during installation, damage from the elements, damage from rodents, etc.)

In various embodiments, armor layer 30 may be formed from a variety of strengthening or damage resistant materials. In the embodiment shown in FIG. 1, armor layer 30 is formed from a corrugated sheet of metal material having an alternating series of ridges 32 and troughs 34. In one embodiment, the corrugated metal is steel, and in another embodiment, the corrugated metal is aluminum. In other embodiments, other non-metallic strengthening materials may be used. In some embodiments, armor layer 30 may be formed from plastic materials having a modulus of elasticity over 2 GPa, and more specifically over 2.7 GPa. Such plastic armor layers may be used to resist animal gnawing and may include animal/pest repellant materials (e.g., a bitter material, a pepper material, synthetic tiger urine, etc.).

Referring to FIG. 1, cable 10 includes an adhesion control material or layer, shown as adhesion control material 36 located between armor layer 30 and cable jacket 12. Specifically, as shown in FIGS. 1 and 2, adhesion control material 36 is located on the outer surface 42 of armor layer 30 adjacent the inner surface 14 of cable jacket 12. Material 36 includes a fluid carrier material that supports or suspends a plurality of particles 38. In general, particles 38 are dispersed and/or suspended in the carrier material, and the carrier material/particle suspension is applied to or coated onto the outer surface of armor layer 30. The carrier material provides for a relatively easy way to apply and evenly distribute particles 38. Further, because of the viscosity of the carrier fluid and the interaction between the carrier fluid and armor layer 30, the carrier material facilitates the holding of particles 38 in place as cable jacket 12 is extruded over armor layer 30.

Referring to FIG. 2, particles 38 provide a physical barrier between inner surface 14 of cable jacket 12 and outer surface 42 of armor layer 30. Thus, in this arrangement, particles include an outer surface that has one portion in contact with armor outer surface 42 and an opposing surface in contact with jacket inner surface 14. Further, particles 38 are formed from a material that is incompatible or immiscible with the material of cable jacket 12 such that particles 38 do not form any substantial adhesion with the material of cable jacket 12 during extrusion. Thus, with particles 38 interposed between armor layer 30 and jacket 12, particles 38 block interaction or adhesion that may otherwise occur between armor layer 30 and jacket 12.

By interrupting this adhesion, particles 38 reduce the total adhesion between armor layer 30 and cable jacket 12 such that cable jacket 12 may be easier to separate from armor layer 30 during various procedures. As explained in more detail below, particles 38 have various physical properties (e.g., particle size, density, etc.) that allow particles 38 to act as both an adhesion control material and to be applied to armor layer 30 at relatively fast line processing speeds during cable formation. It should be understood that while the exemplary embodiments discussed herein relate primarily to use of adhesion control material 36 between armor layer 30 and jacket 12, adhesion control material 36 may be applied to control adhesion between any cable components where adhesion occurs. For example, in one embodiment, adhesion control material 36 may be located between an outer surface of an optical cable core element, such as an elongate strength member and the inner surface of jacket 12. In some such embodiments, the strength member may be a metal rod or a GRP rod.

As noted above, adhesion control material 36 includes a carrier fluid component that supports particles 38 and facilitates application and distribution of particles 38 along armor layer 30. As explained in more detail below, in various embodiments, the fluid carrier material is an oil, and in some such embodiments, the particles 38 form a dispersion with the oil carrier fluid. As shown in FIG. 2, following application of adhesion control material 36 and formation of cable jacket 12, the carrier fluid material is located on the outer surface of armor layer 30 adjacent to particles 38. Further, in various embodiments, at least a portion of the carrier fluid is absorbed into the material of cable jacket 12 in an inner section of cable jacket 12 located adjacent to jacket inner surface 14. This portion is shown as inner jacket portion 40. Thus, in such embodiments, inner jacket portion 40 includes both the polymer material of cable jacket 12 and the carrier material. In various embodiments, the concentration of carrier material (e.g., the type of carrier oil) within in inner jacket portion 40 is between 0.1% and 5%, and the thickness of inner jacket portion 40 is between 0.5 mm and 1.5 mm. In specific embodiments, the concentration of carrier material (e.g., the type of carrier oil) within in inner jacket portion 40 is between 0.87% and 2.57%, the thickness of inner jacket portion 40 is between 0.5 mm and 1.5 mm, the density of the polyethylene material of jacket 12 is 0.94 g/cm$^3$, the amount of adhesion control material 36 applied to armor layer 30 is 12.4 g/m$^2$ and the line speed is 15 m/min. As will be understood, because the carrier material is absorbed into the cable jacket following cable jacket extrusions, the concentration of carrier material within inner jacket portion 40 decreases as the distance from jacket inner surface 14 increases.

In various embodiments, adhesion control material 36 limits adhesion between cable jacket 12 and armor layer 30 such that the peel force required to separate or peel one side of cable jacket 12 (i.e., one half of the cable jacket in the circumferential direction) from armor layer 30 is between 1 lbs and 20 lbs, and more specifically is between 4 lbs and 17 lbs. In various embodiments, peel force may be measured by fixing the cable, including the armor layer, in place using a device such as a clamp or vice, cutting the cable jacket lengthwise on two opposite sides of the cable jacket, and then measuring the force required to pull half of the jacket away from the armor layer in a direction perpendicular and away from the cable jacket.

In various embodiments, particles 38 have a sufficient size to limit adhesion between armor layer 30 and cable jacket 12 as discussed herein. In various embodiments, particles 38 are formed from a material having an average particle diameter between 1 micrometer and 200 micrometers, specifically between 1 micrometer and 100 micrometers and more specifically between 1 micrometer and 25 micrometers. In some embodiments, particles 38 are formed from a material having an average particle diameter between 1 micrometer and 50 micrometers and more specifically between 15 micrometers and 25 micrometers, and in some such embodiments, particles 38 are formed from a polypropylene material.

In some embodiments, particles 38 are formed from a polymer material that has a melting temperature that is lower than the extrusion temperature of cable jacket 12. In such embodiments, particles 38 may melt and/or deform as jacket 12 is extruded over armor layer 30, and in these embodiments, the shape of particles 38 before extrusion of jacket 12 is different from the shape of particles 38 after jacket extrusion. In such embodiments, by meting and spreading out, meltable particles 38 act to increase the surface area of outer surface 42 of armor layer 30 that is blocked from adhering with inner surface 14 of cable jacket 12. Further, as will be understood, in some such embodiments, the inner surface of a particle 38 formed from a meltable material will tend to conform to the outer surface of armor layer 30 that is engaging particle 38 at the time of jacket extrusion. In other embodiments, particles 38 are formed from a nonmeltable material or a material with a melting point higher than the extrusion temperature of cable jacket 12, and in such embodiments, particles 38 do not melt or deform during jacket extrusion.

As noted above, adhesion control material 36 includes particles 38 suspended in a carrier fluid. In various embodiments, adhesion control material 36 includes between 1% and 40% by weight of particles and between 60% and 99% by weight of carrier fluid. In other embodiments, adhesion control material 36 includes between 1% and 31% by weight of particles and between 69% and 99% by weight of carrier fluid.

In various embodiments, particles 38 are formed from materials that have densities low enough in relation to the viscosity of the carrier material such that carrier material provides a stable suspension with particles 38. In various embodiments, particles 38 are formed from a material having a density less than 2.5 grams/ml, and more specifically less than 2.2 grams/ml. In a specific embodiment, particles 38 are formed from a material having a density between 0.85 grams/ml and 0.95 grams/ml, and more specifically between 0.88 grams/ml and 0.92 grams/ml.

Figure 3:
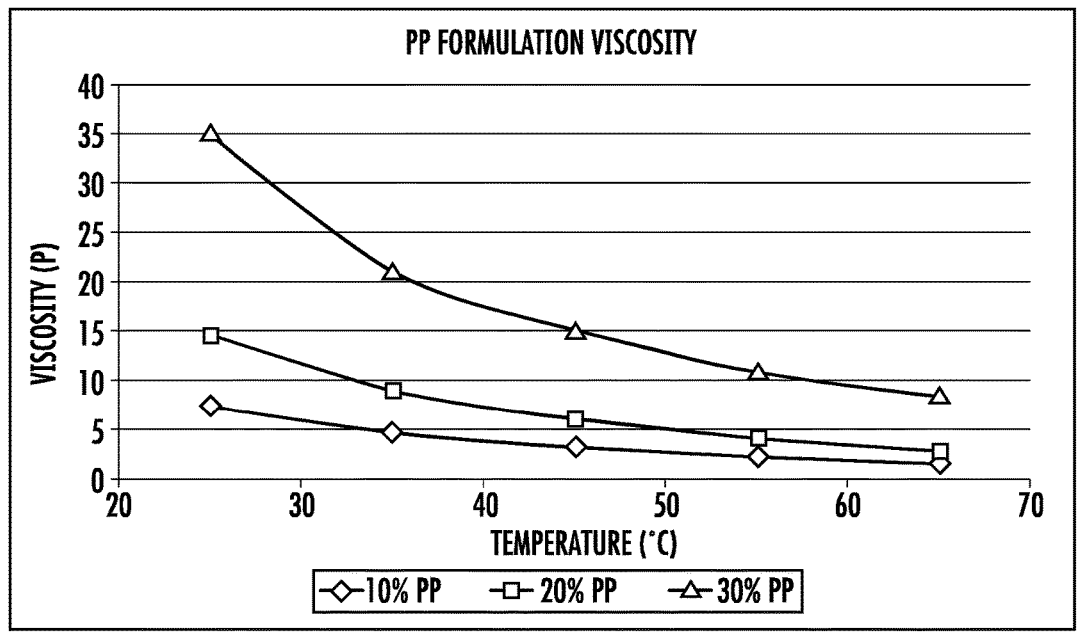
FIG. 3 is a graph showing viscosity relative to temperature of various adhesion control material formulations according to an exemplary embodiment.

In various embodiments, adhesion control material 36 has viscosity that allows particles 38 to remain suspended, but also allows for application onto armor layer 30. In various embodiments, adhesion control material 36 has a viscosity between 5 Poise and 40 Poise measured at 25 degrees Celsius. In a specific embodiment, adhesion control material 36 has a viscosity between 30 Poise and 40 Poise measured at 25 degrees Celsius. In another specific embodiment, adhesion control material 36 has a viscosity between 10 Poise and 20 Poise measured at 25 degrees Celsius. In another specific embodiment, adhesion control material 36 has a viscosity between 5 Poise and 10 Poise measured at 25 degrees Celsius. In some such embodiments, the viscosity of adhesion control material 36 is inversely related to percent content of particles 38. For example, referring to FIG. 3, viscosity of three example formulations of an adhesion control material 36 is shown. As shown in FIG. 3, viscosity of a polypropylene containing adhesion control material 36 is inversely related to the percentage of the control material formed from the polypropylene particles.

In various embodiments, particles 38 may be formed from a variety of particulate materials including polymer materials and inorganic materials. In one embodiment, particles 38 may be formed from a polymer material having both polar groups and non-polar groups. In various embodiments, all particles 38 of adhesion control material 36 may be formed from the same material type, and in another embodiment, adhesion control mixture 36 can include a mixture of more than one type of particles 38 formed from different materials. In addition, in various embodiments, particles 38 can each be formed from a single material type, and in other embodiment, particles 38 can each be formed from a mixture or blend of different materials. In some embodiments, particles 38 can be formed from a mixture of polymers and copolymers that are incompatible and/or immiscible with the material of cable jacket 12.

For example, in various embodiments, particles 38 may be formed from one or more of the following materials nylon, polyvinyl chloride, polypropylene, polyamide, polyacrylic acid, fluoropolymers, polyglycols, polyphenylene oxide, polyvinyl alcohol, polyacrylonitrile, polyesters, polystyrene, polyacrylamide, polyimide, polysaccharide, polyanhydrides, polycarbonate, polymaleic acid, polyacetals, polyacrylates, polyethers, polyurethane, polysiloxanes, boron nitride, magnesium silicates, graphite, molybdenum disulfide and tungsten disulfide. In specific embodiments, one or more of these materials are used to form particles 38, and cable jacket 12 is formed from a polyethylene material (e.g., a medium density polyethylene material).

The carrier fluid of adhesion control material 36 may be a wide variety of materials suitable for suspending particles 38. In various embodiments, the carrier material of adhesion control material 36 is an oil. In specific embodiments, the carrier material is a mineral oil, vegetable oil, silicone oil or any mixture thereof. In a specific embodiment, the carrier fluid is ISO 32 hydraulic oil, and in another specific embodiment, the carrier fluid is a combination of ISO 32 hydraulic oil and naphthenic oil.

Figure 4:
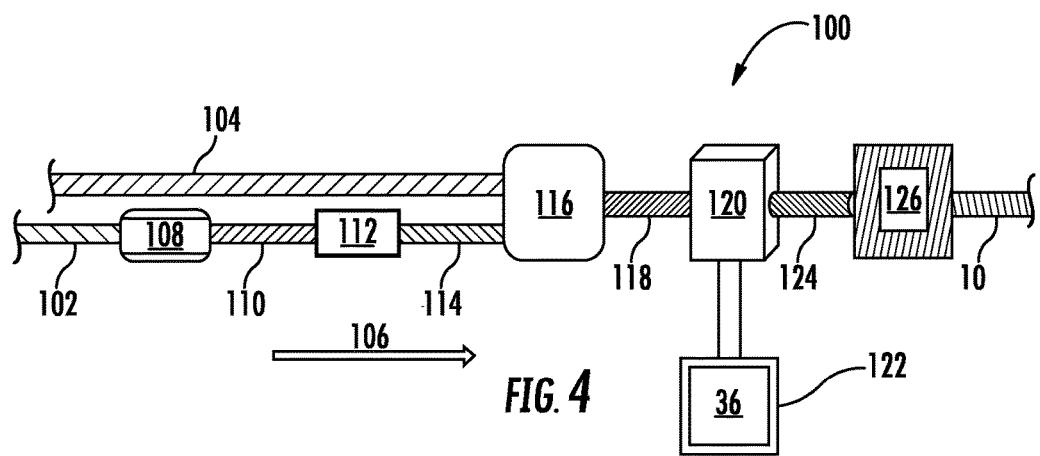
FIG. 4 is a schematic view showing a process of forming an optical cable including an adhesion control layer according to an exemplary embodiment.

Referring to FIG. 4, a system 100 and related method for forming an optical cable, such as cable 10, including an adhesion control material, such as material 36, is shown. At the input to system 100, flat sheet 102 of armor material and one or more fiber optic core elements 104 are continuously supplied along the general process direction 106. In various embodiments, core elements 104 may include optical fibers, optical fiber filled buffer tubes, filler tubes, strength members, optical fiber ribbons, etc. In one embodiment, core elements 104 may be SZ stranded core elements provided to system 100 from a stranding device. In addition to core elements 104, one or more wires, ripcords, binders, water-blocking materials, etc. may also be provided.

Flat armor sheet 102 is passed through a lubricant applicator 108 where an anti-friction agent is coated onto the surface of the flat armor sheet 102 to form lubricated armor sheet 110. The anti-friction agent can be a liquid such as a lubricating oil. In one embodiment, lubricant applicator 108 includes two rotating rollers that are saturated in the lubricants, and flat armor sheet 102 can be coated with the lubricant in applicator 108 by passing between the rotating rollers. The lubricant applied by lubricant applicator 108 lubricates flat armor sheet 102 as it passes through the downstream portions of the armor formation system.

After exiting lubricant applicator 108, lubricant coated armor sheet 110 is then processed through corrugator 112 to become corrugated sheet 114. Corrugator 112 forms ridges and troughs (such as ridges 32 and troughs 34 of armor layer 30) in the sheet of armor material. Corrugator 112 can be a device with two counter rotating corrugating rollers between which the lubricated armor sheet 110 passes.

Following formation of the corrugations, corrugated armor sheet 114 and core elements 104 are aligned and advanced into an armor former 116, where the corrugated armor sheet 114 is wrapped around core elements 104 to form a generally tubular armor layer, such as armor layer 30 discussed above. The armor former 116 can be a die block with decreasing diameter that continuously and concentrically shapes corrugated armor sheet 114 into a tubular form to wrap around the cable core elements 104. This produces an assembly of the armor layer and core elements, shown as armored cable core 118.

The resulting assembly of armored cable core 118 then passes through adhesion control applicator 120. Applicator 120 applies an adhesion control material, such as material 36 discussed above, onto the outer surface of the armor layer of armored cable core 118. In various embodiments, the amount of adhesion control material applied to the armor layer varies based on the speed of the line moving the armor layer through applicator 120. In a specific embodiment, the amount of adhesion control material applied is between 5 $g/m^2$ and 25 $g/m^2$ at line speeds between 2 m/min and 30 m/min. In a specific embodiment, the amount of adhesion control material applied is between 12.4 $g/m^2$ at a line speed of 15 m/min and 30 m/min. Applicator 120 may be in communication with a storage device, shown as storage device 122, that holds adhesion control material 36. In the embodiment shown, applicator 120 is positioned such that adhesion control material 36 is applied to the armor material after both corrugation and wrapping. However, in other embodiments, applicator 120 may be positioned to apply adhesion control material at any point in cable formation prior to cable jacket extrusion.

In various embodiments, applicator 120 may include a variety of systems or arrangements suitable for applying the liquid adhesion control material onto the armored cable core. For example, in one embodiment, applicator 120 can include a flooding head where the armored cable core 118 is at least partially immersed in the adhesion control material 36. In other embodiments, applicator 120 can include other coating devices such as spray coaters or roll applicators. It should be understood that any other cable components, ripcords, binders, water blocking tapes, etc., may also be advanced through applicator 120 along with armored cable core 118.

In various embodiments, prior to application by applicator 120, the adhesion control material, such as material 36, may be formed by any suitable process. In various embodiments, making the adhesion control materials discussed herein involves agitation of the mixture of the particulate matters and the carrier fluids. In one such embodiment, the particulate material and the carrier fluids are charged into a vessel and agitated by a mixing blade with a minimum shear rate of 250 rpm at the temperature between 20 degrees C. and 80 degrees C. for 1 hour. The obtained mixture is then stored in a container, such as storage device 122, at ambient conditions and ready to be applied as the adhesion control material 36 by applicator 120.

Following application of adhesion control material 36, adhesion control coated cable core 124 is advanced into a cable body extrusion apparatus 126. Extrusion apparatus 126 may be an extruder in which a plastic cable jacket material is heated to a molten state and then forced through a die where the extrudate is introduced around the adhesion control coated cable core 124. The extrudate can be formed into the cable jacket, such as cable jacket 12, by tightly covering adhesion control coated cable core 124 by radial shrinkage or drawing down. The profile of the cable jacket can also be defined by the extrusion die under pressure as the extrudate is directly applied onto the adhesion control coated cable core 124. The assembly obtained thereafter is then advanced and cooled down to form a cable, such as cable 10.

In various embodiments, a method of forming an optical communication cable, such as cable 10, is also provided. In various embodiments, the method includes one or more manufacturing step as discussed above regarding the operation of system 100. In various embodiments, the method of forming an optical communication cable includes the step of providing a plurality of elongate optical transmission elements, such as optical fibers 18. The method includes the step of wrapping a sheet of reinforcement material around the plurality of elongate optical transmission elements such that the plurality of elongate optical transmission elements are located within a channel defined by an inner surface of the wrapped sheet of reinforcement material. In one embodiment, the wrapped sheet of reinforcement material is an armor layer, such as armor layer 30, discussed above.

The method also includes the step of applying an adhesion control material onto an outer surface of the reinforcement material. In various embodiments, the adhesion control material, such as adhesion control material 36, includes a carrier fluid and a particulate material, such as particles 38, suspended in the carrier fluid. The method also includes extruding a polymer material over the wrapped sheet of reinforcement material to form a cable jacket such that the adhesion control material is located between an outer surface of the wrapped reinforcement sheet and an inner surface of the cable jacket. In a specific embodiment, the extruding step occurs at an extrusion temperature, and the extrusion temperature is greater than a melt temperature of the polypropylene particles. In a specific embodiment, the adhesion control material is applied after wrapping of the reinforcement sheet. In various embodiments, the methods disclosed herein may include any of the features or elements discussed herein, including features of cable 10, of adhesion control material 36, of particles 38, of system 100, etc.

As noted above, in a specific embodiment, cable jacket 12 is formed from a polyethylene material. In various embodiments, cable jacket 12 may be a variety of materials used in cable manufacturing, such as medium density polyethylene, low smoke, zero halogen polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc. In various embodiments, buffer tubes 20 are formed from one or more polymer material including polypropylene (PP), polybutylene terephthalate (PBT), polycarbonate (PC), polyamide (PA), polyoxymethylene (POM), poly(ethene-co-tetrafluoroethene) (ETFE), etc.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

EXAMPLES

Referring to Table 1 shown below, various exemplary embodiments of adhesion control material 36 are shown. In various embodiments, adhesion control material 36 may include the percent compositions shown in Table 1 and include ranges within plus or minus 5% of the percent compositions shown. In various embodiments, adhesion control material 36 may include particulate material having particle sizes within the ranges shown in Table 1, and, in other embodiments, adhesion control material 36 may include particulate material having particle sizes within plus or minus 25% of the average particle size ranges shown in table 1.

TABLE 1

| Adhesion Control Material ID | Particulate Matterial Type | Mean Particle Diameter (μm) | Carrier Fluid Type |
| --- | --- | --- | --- |
| A | 30% Polypropylene | 15-25 | 70% Hydraulic Oil (ISO32) |
| B | 10% Polypropylene | 15-25 | 90% Hydraulic Oil (ISO32) |
| C | 10% N,N'-Ethylenebisstearamide | 5-8 | 90% Hydraulic Oil (ISO32) |
| D | 1% Graphite | <1.5 | 90% Hydraulic Oil (ISO32) + 9% Naphthenic oil |
| E | 10% Polytetrafluoroethylene | 9 | 90% Hydraulic Oil (ISO32) |
| F | 10% Nylon 6 | 30-50 | 90% Hydraulic Oil (ISO32) |

In various test examples, corrugated armor sheets with different polymer outer coatings and with different adhesion control coating compositions were used to make armor layer tubes with a diameter of 9.5 mm. Medium-density polyethylene (MDPE) based jacket materials were extruded over the armor core to form the cable jacket in a tubing extrusion setup, either by radial shrinkage or drawing down. In another extrusion setup, MDPE based jacket materials were directly applied onto the armor tubes under pressure to form the cable jacket.

Both cable samples with and without adhesion control materials applied to the armor layer were collected at line speed of 15 to 55 meter/min. Peel force was measured using a handheld digital tension gauge. Jacket peel force was recorded as the average force in pounds (lbs.) to separate the jacket from the armor tube along the length of 1 meter cable. Tables 2 and 3 show various peel forces determined using different combinations of line speed, different adhesion control compositions, and different extrusion methods.

TABLE 2

Jacket peel force tests for armor with ethylene acrylic acid copolymer (EAA) laminate outer layer

| Example | Adhesion Control Material Applied | Line Speed (m/min) | Peel Force (lbs.) | Extrusion Setup |
| --- | --- | --- | --- | --- |
| 1a | Formulation B | 15 | 11 | Tubing |
| 1b | Formulation B | 55 | 12 | Tubing |

TABLE 2-continued

Jacket peel force tests for armor with ethylene acrylic acid copolymer (EAA) laminate outer layer

| Example | Adhesion Control Material Applied | Line Speed (m/min) | Peel Force (lbs.) | Extrusion Setup |
|---|---|---|---|---|
| 2 | Formulation C | 55 | 16 | Tubing |
| 3 | Formulation D | 55 | 16 | Tubing |
| 4 | None | 15 | Over 50 | Tubing |
| 5 | None | 55 | Over 50 | Tubing |

TABLE 3

Jacket peel force tests for armor with polyethylene (PE) laminate

| Example | Adhesion Control Material Applied | Line Speed (m/min) | Peel Force (lbs.) | Extrusion Setup |
|---|---|---|---|---|
| 6a | Formulation A | 15 | 5 | Pressure |
| 6b | Formulation A | 45 | 8 | Pressure |
| 6c | Formulation A | 55 | 12 | Pressure |
| 7 | None | 15 | Over 50 | Pressure |
| 8 | None | 55 | Over 50 | Pressure |

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of forming an optical communication cable, the method comprising:
   providing a plurality of elongate optical transmission elements;
   wrapping a sheet of reinforcement material around the plurality of elongate optical transmission elements such that the plurality of elongate optical transmission elements are located within a channel defined by an inner surface of the wrapped sheet of reinforcement material;
   applying an adhesion control material, including a carrier fluid and a particulate material dispersed in the carrier fluid, from an applicator onto an outer surface of the reinforcement material; and
   extruding a polymer material over the wrapped sheet of reinforcement material to form a cable jacket, wherein the adhesion control material is located between an outer surface of the wrapped reinforcement sheet and an inner surface of the cable jacket.

2. The method of claim 1, wherein the adhesion control material comprises between 1% and 40% particulate material and between 60% and 99% carrier fluid.

3. The method of claim 2, wherein the carrier fluid is an oil and the particulate material is formed of particles having an average particle diameter between 1 micrometer and 200 micrometers.

4. The method of claim 3, wherein the carrier fluid is ISO 32 hydraulic oil and the particulate material includes polypropylene particles having an average particle size between 10 micrometers and 30 micrometers.

5. The method of claim 4, wherein the extruding step occurs at an extrusion temperature, wherein the extrusion temperature is higher than a melt temperature of the polypropylene particles.

6. The method of claim 3, wherein the particulate material includes particles of at least one of nylon, polyvinyl chloride, polypropylene, polyamide, polyacrylic acid, fluoropolymers, polyglycols, polyphenylene oxide, polyvinyl alcohol, polyacrylonitrile, polyesters, polystyrene, polyacrylamide, polyimide, polysaccharide, polyanhydrides, polycarbonate, polymaleic acid, polyacetals, polyacrylates, polyethers, polyurethane, polysiloxanes, boron nitride, magnesium silicates, graphite, molybdenum disulfide and tungsten disulfide wherein the carrier fluid includes at least one of mineral oil, vegetable oil and silicon oil.

7. The method of claim 1, wherein the adhesion control material is applied after wrapping of the reinforcement sheet.

8. The method of claim 1, wherein the particulate material is a material different from the extruded polymer material of the cable jacket, and further where the particulate material is immiscible in the polymer material of the cable jacket, wherein the particulate material forms a barrier at the location of the particulate material limiting adhesion between the inner surface of the cable jacket and the outer surface of the reinforcement sheet.

9. The method of claim 1, wherein the reinforcement sheet comprises a corrugated sheet of metal material, and wherein the extruded polymer material of the cable jacket is a polyethylene.

10. An optical communication cable comprising:
    an extruded cable body formed from a polymer material, the cable body having an inner surface defining a channel within the cable body;
    an optical transmission element located within the channel;
    a reinforcement sheet surrounding the optical transmission element; and
    an adhesion control dispersion comprising a liquid carrier material and a plurality of particles dispersed within the carrier material, wherein at least some of the particles are positioned between the reinforcement sheet and the cable body such that at least some of the particles contact an outer surface of the reinforcement sheet and an inner surface of the cable body.

11. The optical communication cable of claim 10, wherein at least a portion of the carrier material is absorbed into an inner section of the cable body, wherein the plurality of particles are formed from a material different from and immiscible with the polymer material of the cable body.

12. The optical communication cable of claim 10, wherein the particles of the adhesion control dispersion are formed from a material having a density of less than 2.5 g/ml.

13. The optical communication cable of claim 10, wherein the adhesion control dispersion acts to limit adhesion between the polymer material of the cable body and the outer surface of the reinforcement sheet such that a peel force required to separate half of the cable body from the reinforcement sheet is between 1 lbs and 20 lbs.

14. The optical communication cable of claim 10, wherein the adhesion control dispersion comprises between 1% and 40% particles and between 60% and 99% carrier fluid.

15. The optical communication cable of claim 10, wherein the liquid carrier material is an oil and the plurality of particles have an average particle diameter between 1 micrometer and 50 micrometers.

16. The optical communication cable of claim 10, wherein the plurality of particles are polypropylene particles having an average particle size between 10 micrometers and 30 micrometers and a density between 0.85 g/ml and 0.95 g/ml, wherein the cable body is formed from a polyethylene material.

\* \* \* \* \*

UNITED STATES PATENT AND TRADEMARK OFFICE
CERTIFICATE OF CORRECTION

PATENT NO. : 10,330,878 B2  
APPLICATION NO. : 15/069108  
DATED : June 25, 2019  
INVENTOR(S) : Amit Chawda et al.

Page 1 of 1

It is certified that error appears in the above-identified patent and that said Letters Patent is hereby corrected as shown below:

In the Claims

In Column 12, Line 25, Claim 6, delete "disulfide" and insert -- disulfide, --, therefor.

Signed and Sealed this
Twenty-eighth Day of January, 2020

Andrei Iancu
*Director of the United States Patent and Trademark Office*